(No Model.)

F. SIEBERT.
BELT PULLEY.

No. 337,024. Patented Mar. 2, 1886.

Attest:
N. N. Low
E. D. Smith

Inventor:
Frederick Siebert
by C. D. Moody
atty.

United States Patent Office.

FREDERICK SIEBERT, OF ST. LOUIS, MISSOURI.

BELT-PULLEY.

SPECIFICATION forming part of Letters Patent No. 337,024, dated March 2, 1886.

Application filed February 14, 1885. Serial No. 155,949. (No model.)

*To all whom it may concern:*

Be it known that I, FREDERICK SIEBERT, of St. Louis, Missouri, have made a new and useful Improvement in Belt-Pulleys, of which the following is a full, clear, and exact description.

The improvement relates to composite pulleys, or those in which the rim and the central portion of the pulley are made separately and then united.

It consists in making the pulley in four parts—two flanges or collars which are attached to the spider and form the pulley-hub, the spider consisting of an inner and an outer ring and a series of spokes which connect the two rings, and the pulley-rim, which is fastened to the spider and bears upon the spokes and the outer ring of the spider.

The annexed drawings, making part of this specification, illustrate the improvement.

Figure 1:
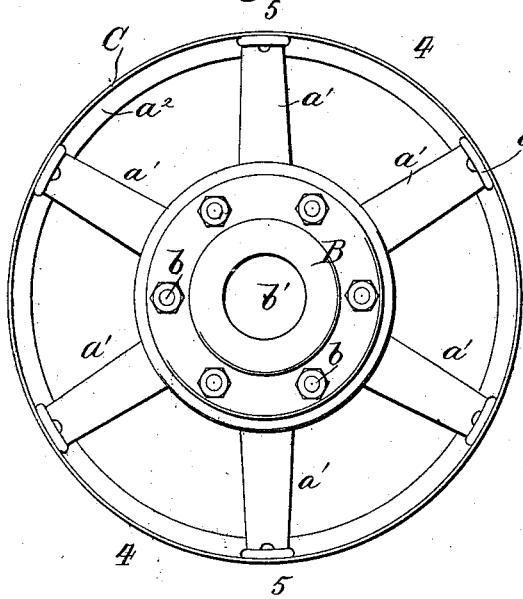
Figure 2:
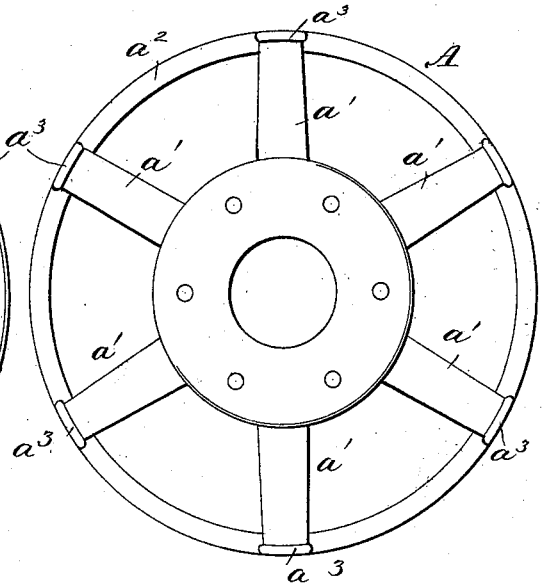
Figure 3:
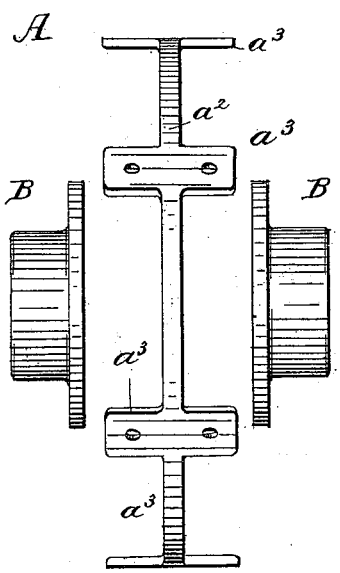
Figure 4:
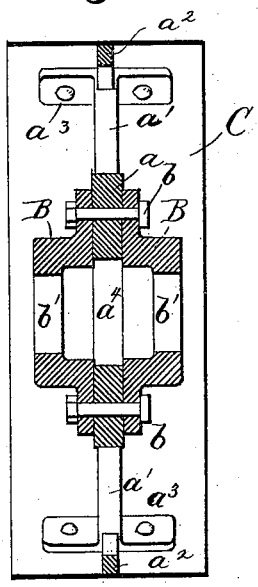
Figure 5:
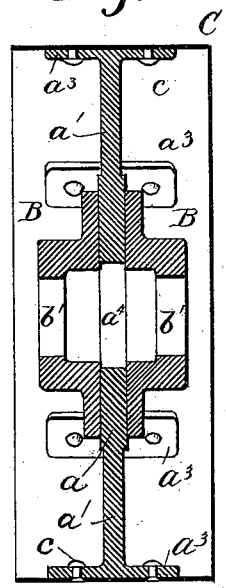

Figure 1 is a side elevation of the pulley. Fig. 2 is a side elevation of the pulley-spider. Fig. 3 is an edge elevation showing, detached from each other, the pulley-spider and the hub-flanges. Fig. 4 is a section on the line 4 4 of Fig. 1, and Fig. 5 is a section on the line 5 5 of Fig. 1.

The same letters of reference denote the same parts.

A, Figs. 2, 3, represents the part termed the "pulley-spider." It consists of the central ring, $a$, extended in the direction of the plane of the spider, the spokes $a'$ $a'$, and the outer ring, $a^2$. The spokes serve to connect the two rings, and the spokes and rings are cast in one piece, as well as the lugs $a^3$ $a^3$.

B B represent the flanges or collars, which are used to form the hub. They are, by means of the bolts $b$ $b$, fastened to the ring $a$, at opposite sides thereof, as shown in Figs. 1, 4, 5. The perforation $b'$ in the flange is smaller in diameter than the opening $a^4$ in the ring. The pulley in this manner is made adaptable to shafts of various sizes, for in the place of the pair of hub-flanges shown, any other pair can be used, provided their opening $b'$ is not larger than the opening $a^4$.

C represents the pulley-rim. While the parts A B B are of cast-iron, the rim may be, and preferably is, of wrought-iron. It is attached to the spider by means of the bolts $c$ $c$, which connect the rim with the lugs $a^3$ $a^3$.

I claim—

The herein-described composite belt-pulley, consisting of the rim C, the spider A, having the central aperture, $a^4$, and the hub-flanges B B, made separate and detachable from the spider, having bearings for the shaft and bolted to the spider-web upon each side thereof, substantially as set forth.

FREDERICK SIEBERT.

Witnesses:
C. D. MOODY,
S. B. HANTS.